United States Patent Office 2,805,235
Patented Sept. 3, 1957

2,805,235

TRIORGANO(1,4-DIFORMYL-2-BUTYL)SILANES AND PROCESS FOR THEIR PREPARATION

Alfred D. Kiffer, Kenmore, and William T. Black, Buffalo, N. Y., assignors to Union Carbide Corporation, a corporation of New York No Drawing. Application March 28, 1955,
Serial No. 497,413

12 Claims. (Cl. 260—448.2)

This invention relates to new organic compounds of silicon which comprise the triorgano(1,4-diformyl-2-butyl)silanes and to a process for their preparation. More particularly, the invention relates to a new class of organic compounds of silicon which comprise the alkoxy(1,4-diformyl-2-butyl)silanes and to a process for their preparation which includes hydrogenating the ozonides of the cyclohex-3-enylalkylsilanes, the cyclohex-3-enylalkylalkoxysilanes and the cyclohex-3-enylalkoxysilanes.

The new compounds of the instant invention are the triorgano(1,4-diformyl-2-butyl)silanes and can be represented graphically by the formula:

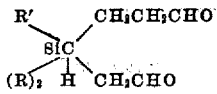

where R and R' represent organic groups such as alkyl groups and alkoxy groups. Examples of the alkyl groups which R and R' may represent include methyl, ethyl, propyl and the like groups, while examples of the alkoxy groups which R and R' may represent include methoxy, ethoxy, propoxy and the like groups. The organic groups represented by R and R' need not necessarily be like groups, that is R and R' may represent different alkyl groups, different alkoxy groups or one may represent an alkyl group while the other may represent an alkoxy group.

In accordance with our invention the new aldehydes thereof are prepared by first reacting a cyclohex-3-enyltriorganosilane with ozone to form an ozonide. The resulting ozonide is then hydrogenated with the formation of the aldehyde. The overall reaction may be depicted by the following equation:

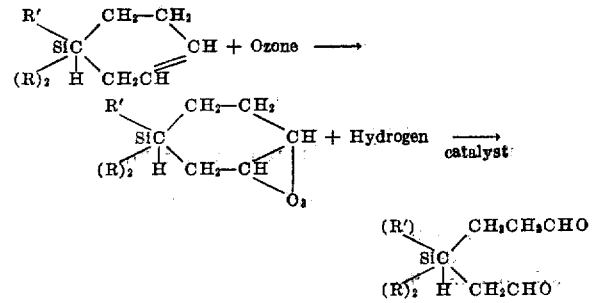

where R and R' represent organic groups as shown above.

The process can be carried out by introducing ozone into a solution of a cyclohex-3-enyltriorganosilane, at low temperatures, to form the corresponding ozonide and then introducing hydrogen into a solution of the azonide, at low temperatures and in the presence of a catalyst, to to form a triorgano(1,4-diformyl-2-butyl)silane.

By the term low temperatures, as used herein, we mean temperatures of about 50° C. and below. Temperatures above 50° C. favor undesirable side reactions according to our experience, and are not preferred. By way of illustration, in the ozonolysis step of the process we have noted a tendency of ozone to decompose and also a tendency of the starting materials to undergo an undesirable oxidation at temperatures above about 50° C. In addition, the hereinabove defined low temperatures are desirable in the hydrogenation of the azonide as at such temperatures the tendency of the ozonide to decompose, rather than react with the hydrogen, is kept at a minimum. The temperatures employed are in some instances governed by the physical properties of the system, as for example the freezing point of the particular solvent present. We have found it preferable to employ temperatures of from about −80° C. to about 30° C., especially temperatures of from about −80° C. to about −30° C., when conducting the ozonolysis step of our process and temperatures of from about −30° C. to about 50° C., especially temperatures of from about −10° C. to about 10° C., when conducting the hydrogenation step.

As solvents we can employ practically any of the so called liquid organic solvents in which our cyclohex-3-enyltriorganosilane starting material, as well as the corresponding ozonide is soluble and which is non-reactive, under the conditions of our process, with the cyclohex-3-enyltriorganosilane starting material, ozone, the resulting ozonide and hydrogen. Desirable for use are the alkanols such as for example methanol, ethanol, propanol and the like.

We prefer to carry out the process of our invention under substantially anhydrous conditions. However, the presence of water is not objectionable, except when the starting material contains alkoxy groups bonded to the silicon atom thereof. The presence of water is objectionable in the latter instance due to the tendency of the alkoxy groups to hydrolyze when in admixture therewith.

In the hydrogenation step of our process any of the well known class of hydrogenation catalysts may be employed. We prefer to use such active hydrogenation catalysts as platinum, palladium black, palladium oxide and Raney nickel. The amount of catalyst employed is not narrowly critical and from about 0.3 percent to about 3.0 percent by weight of the starting cyclohex-3-enyltriorganosilane is preferred but higher or lower amounts can be used with good results.

The cyclohex-3-enyltriorganosilanes starting materials can be represented graphically by the formula:

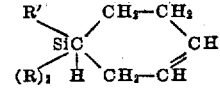

where R and R' represent organic groups taken from the group consisting of alkyl groups and alkoxy groups. Examples of the alkyl groups which R and R' may represent include methyl, ethyl, propyl and the like groups while examples of the alkoxy groups which R and R' may represent include methoxy, ethoxy, propoxy and the like groups. As is evident R and R' may represent different alkyl groups, different alkoxy groups or one may represent an alkyl group while the other an alkoxy group.

Without wishing to be bound by any particular theory, one possible explanation for the position of the olefinic linkage in the cyclohexenyl radical is that when the olefinic linkage is less than three carbon atoms removed from the silicon atom, the carbon to silicon bond of the products formed as a result of subsequent reactions, such as hydrogenation, oxidation or hydrolysis is extremely weak and cleavage thereof apparently takes place. By way of illustration, ozonolysis of vinyltrimethylsilane and allyltrimethylsilane, under conditions the same or similar to those used in the present invention, did apparently result in the formation of the corresponding ozonides; but upon subsequent hydrogenation of the ozonides, it was not possible to obtain the aldehydes.

Similarly, according to our experience, ozonolysis of 2-butenyltrimethylsilane and subsequent hydrogenation of the ozonide in solution will produce an aldehyde; (analysis of reaction solution indicated presence of aldehyde groups) however, the aldehyde could not be recovered from solution. Instead there was recovered a mixture which was predominately trimethylmethoxysilane with minor amounts of higher boiling silicon compounds. One of these compounds was identified as the dimethyl acetal of (trimethylsilyl)acetaldehyde.

The cyclohex-3-enyltriorganosilanes which we employ as starting materials are derivatives of cyclohex-3-enyltrichlorosilane which compound may be obtained by reacting butadiene with vinyltrichlorosilane at a temperature of about 180° C. The cyclohex-3-enyltrialkylsilanes are prepared by reacting cyclohex-3-enyltrichlorosilane with an alkyl Grignard reagent. For example, cyclohex-3-enyltripropylsilane can be prepared by reacting cyclohex-3-enyltrichlorosilane with sufficient quantities of propyl magnesium bromide as to result in the replacement of all the chlorine atoms with propyl radicals. The cyclohex-3-enyltrialkoxysilanes are prepared by reactiong cyclohex-3-enyltrichlorosilane with an alkanol. For example cyclohex-3-enyltripropoxysilane can be prepared by reacting cyclohex-3-enyltrichlorosilane with sufficient amounts of propanol as to result in the replacement of all the chlorine atoms with propoxy groups. In addition, cyclohex-3-enylalkyldialkoxysilane and cyclohex-3-enyldialkylalkoxysilane may be prepared by a combination of the methods referred to above. For example, cyclohex-3-enylethyldiethoxysilane may be prepared by first reacting cyclohex-3-enyltrichlorosilane with limited amounts of ethyl magnesium bromide so as to replace only a single chlorine atom of each molecule with an ethyl radical and by subsequently reacting the resulting cyclohex-3-enylethyldichlorosilane with sufficient quantities of ethanol to replace the remaining chlorine atoms with ethoxy groups.

The triorgano(1,4-diformyl-2-butyl)silanes of this invention are prepared by dissolving a cyclohex-3-enyltriorganosilane, such as cyclohex-3-enyltriethoxysilane in a suitable solvent, such as absolute ethanol, and placing a flash thereof within a bath cooled with solid carbon dioxide. When the solution has reached the temperature of the bath, which will be about −80° C., ozone, which may be produced in a silent electric discharge, is bubbled through the solution until no more is absorbed which indicates that ozonolysis is complete. The appearance of ozone in the off gas can be detected by a bubbler filled with a solution of potassium iodide and also by the fact that the reaction solution turns blue as a result of the presence of excess ozone. Excess absorbed oxygen and ozone can be removed from the reaction solution by sparging with nitrogen gas. Hydrogenation of the ozonide is effected by placing the solution containing the ozonide in a hydrogenation flask, adding a catalyst and charging hdyrogen thereinto. The hydrogenation is conducted at low temperatures and it will be found desirable to place the flask in a water-ice bath during the reaction. Upon completion of the hydrogenation reaction, that is when all of the ozonide has been reacted, the solution is then filtered to remove the catalyst and other solids if present.

We have found that the aldehydes of our invention do not form completely stable solutions with alkanols. That is, if the aldehydes are dissolved in an alkanol and the solution permitted to stand for several hours the aldehyde groups are converted to unreactive alkyl acetals. Consequently, since the preferred solvents employed in the ozonolysis and hydrogenation steps are alkanols, it will be desirable to replace the alkanol with a solvent non-reactive with the aldehydes, as for instance, an aromatic hydrocarbon, after hydrogenation is completed. According to our experience the triorgano(1,4-diformyl-2-butyl) silanes of the present invention when in solution with aromatic hydrocarbons, as for example toluene or other solvents non-reactive therewith, can be stored for over a period of several months without deterioration or decomposition.

The following examples are illustrative of the invention:

Example 1

A solution comprising 20 grams of cyclohex-3-enyltrimethylsilane and 125 cc. of methanol was placed in a flask and the flask positioned within a bath cooled with solid carbon dioxide. The solution was permitted to cool to the temperature of the bath (approximately −78° C.). Ozone, produced in the silent electric discharge at a concentration of about 4 mole percent in oxygen, was then bubbled into the solution. (Theoretical amount of ozone require=130 millimoles.) The completion of the ozonolysis was noted by both the appearance of ozone in the off gas as detected by a bubbler filled with a solution of potassium iodide and by noting that the color of the reaction solution became blue. Excess absorbed oxygen and ozone were removed from the reaction solution by sparging with nitrogen gas. The solution was then transferred to a hydrogenation flask, containing 0.5 gram of palladium black and the flask positioned within a water-ice bath. Hydrogen was introduced into the solution until the pressure in the flask reached 2.5–3.5 atmospheres and the flask then slowly shaken. When the pressure in the flask ceased to drop, the solution was removed therefrom and passed through a filter to separate the catalyst. Trimethyl-(1,4-diformyl-2-butyl)silane was identified through its aldehyde content which was determined by the method disclosed by Smith and Mitchell in "Analytical Chemistry," 22, No. 6(1950). It was found that the aldehyde yield was 69 percent of theory, based on the starting cyclohex-3-enyltriorganosilane.

Example 2

The reaction disclosed in Example 1 was repeated and in this instance toluene was added to the solution after hydrogenation and after the removal of the hydrogenation catalyst. The new solution was then placed in a still and the methanol, water and some toluene removed therefrom by a vacuum stripping operation conducted at a temperature of about 25° C. under a vacuum of 0.1 to 1 mm. Hg absolute. The residue from this stripping operation was transferred to a Hickman molecular still and distilled under 5 microns Hg pressure absolute and the distillate collected as a single cut. The distillate was identified as trimethyl(1,4-diformyl-2-butyl)silane with the following data obtained:

|   | Distillate Analysis (Wt. Percent) | Theory, Wt. Percent $Me_3SiC\diagup^{CH_2CH_2CHO}_{\diagdown^{H}_{CH_2CHO}}$ |
|---|---|---|
| C | 57.3 | 58.1 |
| H | 8.9 | 9.7 |
| Si | 11.5 | 15.1 |

A positive test for aldehyde groups with Schiff's reagent was also obtained.

Example 3

A solution comprising 20 grams of cyclohex-3-enyltrimethoxysilane and 125 cc. of methanol was placed in a flask and the flask positioned with an acetone bath cooled with solid carbon dioxide. The solution was permitted to cool to the temperature of the bath (approximately −78° C.). Ozone, produced in the silent electric discharge at a concentration of about 4 mole percent in oxygen, was then bubbled into the solution. (Theoretical amount of ozone required=130 millimoles.) The completion of ozonolysis was noted by both the appearance of ozone in the off gas as detected by a bubbler filled with a solution of potassium iodide and by noting that the color of the reaction solution became blue. Excess absorbed ozone and oxygen was removed from the reaction solution by sparging with nitrogen gas. The solution was then transferred to a hydrogenation flask, containing 0.25 gram of palladium black and the flask positioned within a water-ice bath. Hydrogen was introduced into the solution until the pressure in the flask reached about 3 atmospheres pressure and the flask then shaken slowly. When the pressure in the flask ceased to drop, the solution was removed therefrom and passed through a filter to remove the catalyst. The solution was found to contain trimethoxy(1,4-diformyl-2-butyl)silane by analysis for aldehyde content by the hydroxylamine method. The yield of aldehyde was 73 percent of theory, based on the starting cyclohex-3-enyl-triorganosilane.

Toluene was then added to the solution and the solution placed in a still. The methanol, water and some toluene were removed from the solution by a vacuum stripping operation. During the stripping operation the temperature did not rise above 50° C. In the final stripping step the concentration of the aldehyde was adjusted to between 5 and 20 percent in toluene. The aldehyde was analyzed and the following data obtained:

|  | Analysis | Theory for (MeO)₃SiC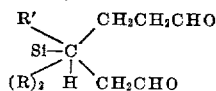 |
|---|---|---|
| Aldehyde/Silicon Ratio | 1.8/1 | 2.0/1 |

The new compounds of our invention are useful as starting materials in the preparation of both monomeric and polymeric organosilanes. For example, the compounds of our invention may be hydrogenated to prepare their corresponding diols. In addition, the new compounds, by virtue of their aldehyde groups, find use as linking agents for organic condensation resins, particularly the phenol- and urea formaldehyde condensation resins which are employed as coatings and as casting compositions. Our compounds may also be employed as linking agents for hydroxyl-free polysiloxanes which linked polymers find use as high temperature resistant enamels. The new compounds may also be employed in the preparation of polysiloxanes containing silicon-bonded aldehyde groups which polysiloxanes are suitable for use as coatings. Such polymeric materials are disclosed and claimed in United States application Serial No. 508,313 filed May 13, 1955.

What is claimed is:

1. Triorgano(1,4-diformyl-2-butyl)silanes represented by the graphic formula:

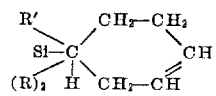

wherein R and R' represent organic groups taken from the class consisting of alkyl groups and alkoxy groups.

2. Trialkyl(1,4-diformyl-2-butyl)silanes.
3. Trialkoxy(1,4-diformyl-2-butyl)silanes.
4. Trimethyl(1,4-diformyl-2-butyl)silanes.
5. Trimethoxy(1,4-diformyl-2-butyl)silanes.
6. Triethyl(1,4-diformyl-2-butyl)silanes.
7. Triethoxy(1,4-diformyl-2-butyl)silanes.

8. A process for preparing a triorgano(1,4-diformyl-2-butyl)silane, represented by the graphic formula:

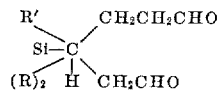

wherein R and R' represent organic groups taken from the class consisting of alkyl groups and alkoxy groups, which comprises introducing ozone into a solution of a cyclohex-3-enyltriorganosilane, represented by the graphic formula:

wherein R and R' represent organic groups taken from the class consisting of alkyl groups and alkoxy groups, to form the ozonide of said cyclohex-3-enyltriorganosilane and introducing hydrogen into a solution of said ozonized cyclohex-3-enyltriorganosilane in the presence of a hydrogenating catalyst to form a triorgano(1,4-diformyl-2-butyl)silane.

9. A process for preparing a trialkyl(1,4-diformyl-2-butyl)silane which comprises introducing ozone into an alkanol solution of a cyclohex-3-enyltrialkylsilane at a temperature below about 30° C. to form the ozonide of said cyclohex-3-enyltrialkylsilane and introducing hydrogen into a solution of said ozonized cyclohex-3-enyltrialkylsilane at a temperature below about 50° C. and in the presence of a hydrogenating catalyst to form a trialkyl (1,4-diformyl-2-butyl)silane.

10. A process for preparing a trialkoxy(1,4-diformyl-2-butyl)silane which comprises introducing ozone into an alkanol solution of a cyclohex-3-enyltrialkoxysilane at a alkanol solution of a cyclohex-3-enyltrialkoxysilane at a temperature below about 30° C. to form the ozanide of said cyclohex-3-enyltrialkoxysilane and introducing hydrogen into a solution of said ozonized cyclohex-3-enyltrialkoxysilane at a temperature below about 50° C. and in the presence of a hydrogenating catalyst to form a trialkoxy(1,4-diformyl-2-butyl)silane.

11. A process for preparing a trimethyl(1,4-diformyl-2-butyl)silane which comprises introducing ozone into a methanol solution of a cyclohex-3-enyltrimethylsilane at a temperature of from about —80° C. to about +30° C. to form the ozonide of said cyclohex-3-enyltrimethylsilane and introducing hydrogen into a solution of said ozonized cyclohex-3-enyltrimethylsilane at a temperature below about 10° C. and in the presence of a palladium catalyst to form trimethyl(1,4-diformyl-2-butyl)silane.

12. A process for preparing a trimethoxy(1,4-diformyl-2-butyl)silane which comprises introducing ozone into a methanol solution of a cyclohex-3-enyltrimethoxysilane at a temperature of from about —80° C. to about +30° C. to form the ozonide of said cyclohex-3-enyltrimethoxysilane and introducing hydrogen into a solution of said ozonized cyclohex-3-enyltrimethoxysilane at a temperature below about 10° C. and in the presence of a palladium catalyst to form trimethoxy(1,4-diformyl-2-butyl)-silane.

No references cited.

UNITED STATES PATENT OFFICE
Certificate of Correction

Patent No. 2,805,235                                   September 3, 1957

Alfred D. Kiffer et al.

It is hereby certified that error appears in the printed specification of the above numbered patent requiring correction and that the said Letters Patent should read as corrected below.

Column 1, lines 28 to 31 inclusive, the formula should appear as shown below instead of as in the patent:

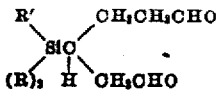

lines 49 to 61, the equation should appear as shown below instead of as in the patent:

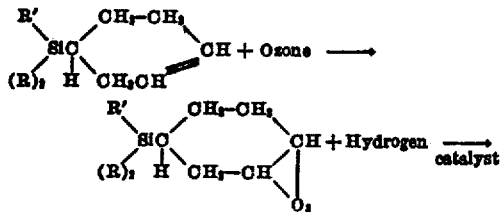

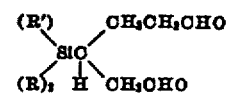

same column, line 66, for "azonide," read —ozonide,—; column 2, line 6, for "azonide" read —ozonide—; lines 46 to 49, the formula should appear as shown below instead of as in the patent:

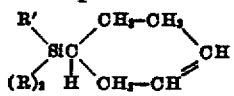

column 3, line 22, for "reactiong" read —reacting—; line 42, for "flash" read —flask—; line 56, for "hdyrogen" read —hydrogen—; column 5, lines 53 to 57, the formula should appear as shown below instead of as in the patent:

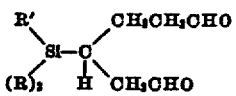

column 6, lines 4 to 7, the formula should appear as shown below instead of as in the patent:

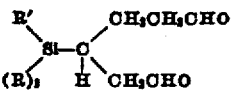

same column, lines 13 to 16, inclusive, the formula should appear as shown below instead of as in the patent:

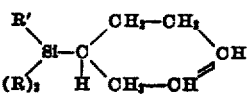

same column, line 35, strike out "alkanol solution of acyclohex-3-enyltrialkoxysilane at a"; line 37, for "ozanide" read —ozonide—.

Signed and sealed this 4th day of February 1958.

[SEAL]

Attest:
KARL H. AXLINE,
*Attesting Officer.*

ROBERT C. WATSON,
*Commissioner of Patents.*